Patented Mar. 14, 1950

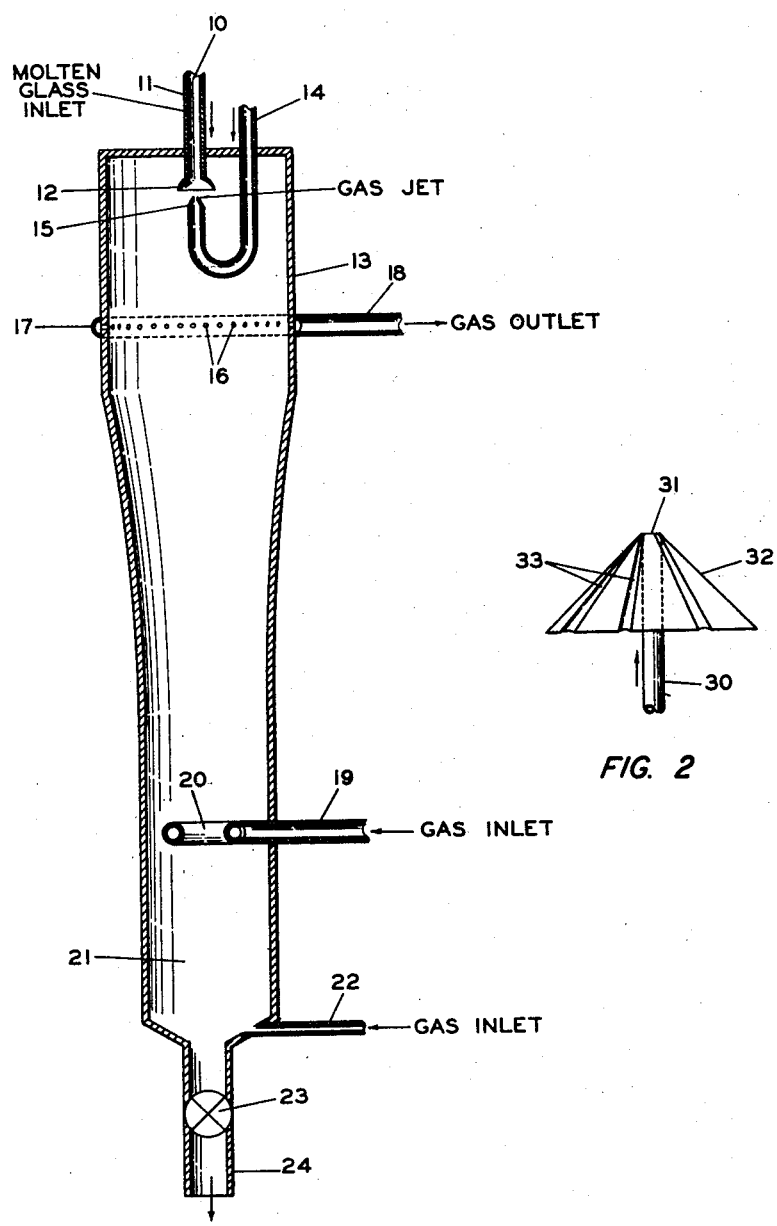

2,500,801

UNITED STATES PATENT OFFICE 2,500,801

PREPARATION OF CATALYTIC BODIES

J. Frank Church, Bartlesville, Okla., assignor to Phillips Petroleum Company, a corporation of Delaware Application November 7, 1946, Serial No. 708,415

14 Claims. (Cl. 252—432)

1

This invention relates to siliceous pebbles. In a particular aspect it relates to the preparation of porous silica pebbles which have utility in absorption processes and as catalysts or carriers for catalyst materials.

Siliceous highly porous glass has been described in numerous patents and may be prepared as described by Hood et al., Patent Number 2,106,744, issued February 1, 1938. Such glass has been molded into various shapes, leached out to leave a porous structure in the glass and the porous glass impregnated with various colored materials to form unique composite articles of a novelty nature. The particular nature of the porous glass, combined with unusual adsorptive properties, has made this a relatively easy and simple process. Porous glass of this nature has selective adsorptive properties which make it useful in removing impurities from liquids and as an adsorbent for gases. It has been suggested that porous glass such as this would be an excellent catalyst or a carrier for catalytic material in certain catalytic processes but, to my knowledge, no specific means or methods for utilizing or forming the glass into catalytic particles or pebbles has been described in literature.

It is, therefore, an object of this invention to describe a method of producing siliceous glass pebbles particularly useful as catalytic bodies.

Another object is to describe a method of preparing highly porous siliceous pebbles suitable as carriers for catalytic material.

A further object is to describe a method of producing porous glass pebbles of a design and shape especially suited for catalytic purposes.

A still further object is to provide for the formation of glass spheres by the dispersion of molten glass by a gas jet.

Another object is the preparation of catalytic glass spheres by dispersing molten composite glass in a gas stream, cooling and leaching out the spherical pebbles.

These and other objects may be realized from the following description and a study of the accompanying diagram of which Figure 1 is a diagrammatic view of one modification for performing the present invention and Figure 2 is another modification of a dispersing unit.

In the practice of the present invention, molten glass of a composition similar to that described hereinafter is introduced into the upper portion of a cooling column through a narrow inlet and is dispersed into small pebbles or spherical drops which descend countercurrently to an upwardly surging stream of gas. During the descent the pebbles are constantly agitated by the stream of gas and are cooled sufficiently to retain their shape by the time they have reached the bottom of the column. From the lower end of the column the pebbles are transferred to a subsequent zone for further treatment to produce the desired porosity. Pebbles suitable for leaching may be made from a glass containing about 60% to 82% $SiO_2$, 20% to 25% $B_2O_3$ and 5% to 10% alkali oxide. In these glasses alumina may be present in amounts of from 1% to 10% and its presence is advantageous in facilitating the subsequent leaching of the glass. When alumina is present and it is desired to prepare siliceous pebbles containing a portion of alumina, as in the case of preparing a silica-alumina catalytic body such as frequently used in hydrocarbon cracking processes, the alumina may be only partially leached out to thus prepare silica-alumina pebbles. After the glass has been dispersed into pebbles or spheres and cooled sufficiently to maintain its shape the pebbles are submitted to a heat treatment at a temperature below the fusion point of the glass, preferably about 525 to 600° C., for a time necessary to cause a change in the structure of the glass pebbles. This change is in the nature of a molecular rearrangement with the formation of two interdispersed compositions which may be called phases, one of which is very rich in silica and is insoluble in acid and the other of which is very rich in boric oxide, alkali, and the remaining material and is soluble in acid. In other words, a change takes place in the structure of the glass so that the constituents other than silica are separated therefrom and collect in a phase which is for the most part soluble in acid and may be extracted, thereby leaving highly porous siliceous glass which retains the shape of the original glass.

Following the heat treatment pebbles are leached out with dilute hydrochloric, nitric, or sulfuric acid. The pores formed by leaching are microscopic to submicroscopic depending upon the degree of leaching and the initial constitution of the glass. Maximum speed of extraction may be had by maintaining the temperature of the acid at or near its boiling point. The progress of the extraction may be observed because the interface between the extracted and unextracted portion of the glass is visible. Instead of carrying the extraction to completion, it may be stopped when any desired depth has been reached by removing the pebbles from the acid bath. After the acid treatment, the pebbles are washed to remove all traces of the soluble constituents which have been acted on by the acid. This is best accomplished by immersing them for several hours in pure running water so as to expose the entire surface of the pebbles to the washing action. The removal of the soluble phase leaves the silica phase as a rigid structure possessing the original shape of the pebbles, but submicroscopically porous, the pores being filled with water. The pebbles are then dried and in general are substantially translucent to transparent probably because the individual pores are too small to reflect light.

The present invention may be more thoroughly understood by reference to Figure 1 in which molten glass is introduced to the cooling column through inlet 10 within insulated pipe 11 having an enlarged conical end portion 12 within the gas chamber 13. Heated gas is introduced as by line 14 through gas jet 15 under a pressure and flow rate sufficient to disperse glass into small spheres as it leaves the glass inlet. For convenient operation of the process the jet immediately below the inlet is placed slightly apart therefrom, substantially as shown in the diagram. The dispersing gas may be removed from the chamber through a series of holes 16 in annular alignment in the outer shell of the cooling column. The gas emerging through the holes may be conveniently collected in an annular tube 17 covering said holes on the outside of the column and removed through an outlet 18 for waste dispersion or recycle to the cooling column as a source of turbulence as described below or after reheating, returned to the dispersing gas jet described above. The cooling column is preferably narrower in the lower portion, as shown, to direct the pebbles through pebble outlets in the bottom and to create greater turbulence from gas introduced in the lower part of the column, as at inlet 19, through which heated gas is introduced into the column through an annular ring 20 having perforations on the upper side thereof. Gas introduced hereby is controlled at a temperature and velocity to solidify pebbles and retard their descent to a turbulent bed of pebbles near the bottom of the column. Several gas inlets may be provided throughout the length of the column if desired. Further cooling may be provided by utilizing a zone 21 below the gas inlet 19 in the column as a chamber into which cooler gas is introduced into the body of the pebbles as by an inlet 22. Gas introduced by inlets 19 and 22 may be removed from the gas column through the gas outlet 18 in the upper portion of the column along with the gas from the dispersing gas jet. The heat treatment described above may be accomplished by maintaining the pebbles at a temperature in the range of 525 to 600° C. in the lower portion of the air chamber or cooling column 13 for several hours to effect the separation into a silica phase and a non-silica phase. Otherwise, the pebbles may be cooled to room temperature relatively quickly and given the added heat treatment in a separate operation (not shown). A star wheel 23 or similar outlet valve is located at the bottom of the tower for continuously removing pebbles from the cooling tower through a line 24 to subsequent use or treatment. The size of the pebbles produced by this method of operation will depend upon the rate of flow of the molten glass, the size of the inlet introducing the molten glass and the size of the gas jet, as well as the volume, force, and heat of the gas introduced through the gas jet. With suitable controls very small pebbles may be made with this method. Any inert gas such as flue gas, air, nitrogen, carbon dioxide, etc., may suitably be employed as the dispersing and turbulent medium. The gas employed may be heated to the proper temperature in a conventional pebble heating unit, if desired. Also, combustion gas from a burning jet of gas may be tempered to the required temperature and employed in the column.

Larger sized pebbles may be produced by omitting the dispersing gas jet and allowing the molten glass stream to drop as it slowly flows from a nozzle or a series of nozzles projecting downwardly into the upper portion of the cooling column. A similar effect can be obtained by replacing the inlet nozzle with a fluted cone and introducing the molten glass at the apex of the upright cone as shown in Figure 2. By this arrangement, molten glass of the nature described is introduced through line 30 and on emerging at the top of the line, or apex 31 of the cone, flows uniformly down the sides of the conical cap 32 through a series of flutes 33 formed in the side of the cone. Each stream will break into droplets as it leaves the lower edge of the cone surface thus forming spheres of glass similarly as above. In the modification of Figure 2 the size of the glass spheres will depend in part on the size of the fluted channels similarly as upon the size of the inlet of inlets where the glass stream is allowed to drip from the nozzle or the series of nozzles. The size of the glass spheres will depend also upon the temperature and fluidity of the molten glass stream and the rate of introduction of the glass. Thus by either modification described above, spherical glass pebbles of various suitable sizes may be formed. Molten glass may also be dispersed into the column by spraying the fluid glass under pressure into the column through a fine nozzle.

Temperatures in the upper region of the column must be maintained at the approximate fusion temperature of the glass, that is, 1,000 to 1,200° C. while lower temperatures which will effect the solidification of the glass droplets are required in the lower region of the column. Hot gases removed from the upper region may be recycled and mixed with tempering gas to attain the desired temperature conditions upon introduction into various parts of the column. Forcing lower temperature gas into the column through perforated annular tubing with the perforations on the upper side as described above will maintain the bed of pebbles in an elastic, agitated condition which will prevent agglomeration of the solid but soft pebbles until they are sufficiently cooled to maintain their shape. After cooling to about atmospheric temperature or after the heat treatment described above to separate the constituents of the glass into two phases, the pebbles are released as described. As noted, the leaching process may be conducted for a time sufficient to produce a porous layer of any desired thickness. For the purpose of the present invention a porous surface layer so formed should be at least one-tenth of a millimeter thick and may be any depth from that to a completely leached out glass pebble. The size of the pores will be at least microscopic but may be controlled to some extent, at least, by the composition of the glass.

Porous silica pebbles described herein may be used as such for various absorption processes or as catalyst in processes in which silica may be used as catalyst. Porous pebbles may also be used as a catalyst support where desirable. In the latter case, pebbles are submerged in a liquid solution of the catalytic material for a time sufficient for the liquid to penetrate the pores of the catalyst pebble. After the solution has thoroughly penetrated the pores, the pebbles are removed and dried by heating gently, thereby depositing the catalytic material on the surface of the pores and on the pebbles. After removal of the volatile solvent the pebbles may be subjected to further heating to condition and activate the catalyst as, for example, may be done in preparation of alumina catalyst when aluminum nitrate is deposited and then heated to convert the nitrate to the oxide. It will be recognized, of course, that the solution of catalyst must be sufficiently dilute that the deposition of catalyst upon drying will not be heavy enough to clog or close the pores of the pebbles. In case an emulsion or suspension of the catalyst is used for impregnation, the catalyst particles must be sufficiently comminuted so that the pore channels will be open after deposition of the catalyst. Due to the greatly extended surface of the pebbles within the pores of these pebbles, a substantially larger surface area of catalyst is exposed per unit volume so that the pebbles with the catalytic material deposited therein are much more active than similar solid pebbles of the catalytic material only externally impregnated with catalytic material.

Although silica particles of other shapes and construction are also useful as catalysts, the porous silica pebbles of this invention are particularly advantageous for catalytic processes of the suspended or fluid type, since the relatively small spheres flow freely throughout the equipment and suffer much less attrition as well as causing less abrasion to the equipment in which they are used.

The relatively small porous siliceous pebbles are useful as such or when impregnated with catalyst as an adsorbent in various processes. The catalyst may advantageously be employed in a moving bed, stationary bed or a suspended catalyst process. The desirable size for the pebbles will, of course, depend to some extent upon the type process in which they are to be used.

The following examples illustrate the advantages of the present process in the preparation of catalytic pebbles.

*Example I*

Molten siliceous material containing approximately 70% $SiO_2$, 20% $B_2O_3$, 5% $Na_2O$, and 5% $Al_2O_3$ is dispersed into a cooling column, solidified, and subjected to the heat treatment as described. The pebbles are placed in a bath of dilute HCl to leach out substantially all of the boric oxide and sodium oxide and sufficient of the aluminum oxide to leave about 3% of the latter in the porous phase of the pebbles. The resulting silica-alumina pebbles show distinctive catalytic properties in a hydrocarbon cracking process.

*Example II*

Another molten siliceous material composition containing about 72% $SiO_2$, 24% $B_2O_3$, and 4% $Na_2O$ is dispersed into the cooling column described, solidified, and subjected to the phase-separating heat treatment. The pebbles are submerged in a heated dilute nitric acid bath until substantially leached out. The pebbles are submerged for a few minutes in a dilute solution of HF and are then washed and placed in a 5N solution of aluminum nitrate until the pores are saturated with the solution. The pebbles are gently heated at increasing temperatures to avoid possible shattering by too sudden temperature change. Heating is continued until substantially all excess moisture is dispelled from the pores by the glass, leaving a deposit of hydrous aluminum nitrate on the surface of the pebbles and their intricate porous channels. The pebbles are then subjected to a temperature of about 300° C. for several hours to decompose the nitrate salt to aluminum oxide. The alumina impregnated silica pebbles likewise show important promoting properties in catalytic conversion processes such as catalytic cracking of hydrocarbons.

To increase the adherence of any impregnated catalyst on the surface of the pebbles or within the pores thereof, it may be desirable to etch the surface of the glass before impregnation by emerging it for a few minutes in a dilute solution of hydrofluoric acid or in a hot 5% solution of sodium hydroxide. Catalytic pebbles may be used until inactivated and regenerated in a suitable, conventional manner. Any catalyst capable of being satisfactorily dissolved or suspended in a volatile liquid is suitable for impregnation in the porous glass pebbles. Inorganic metal oxide and halide salts, such as alumina and the Friedel-Crafts catalysts, are especially suitable for impregnation. Although the discussion and method of formation of the glass pebbles has evolved around the preparation of porous glass pebbles, siliceous material of other compositions, even such as are not capable of being leached out, may be dispersed into catalytic pebbles as described herein.

The examples are illustrative only and are not intended to limit the invention which may be modified in numerous ways obvious to one skilled in the art without departing from the spirit of the invention as described above and recited in the following claims.

I claim:

1. A process for the preparation of porous siliceous pebbles which comprises dispersing molten glass into a cooling column to form spherical drops of molten glass; gradually cooling and solidifying said dispersed glass spheres as they gradually descend through a rising stream of hot gas in said column maintained at a temperature below the melting point of said glass; separating said glass into two phases by heat treatment in the range of 525 to 600° C. in the lower portion of said column; and further cooling and recovering said pebbles.

2. A process for the production of porous siliceous pebbles having improved catalytic properties which comprises dispersing molten glass into relatively small glass spheres in a solidifying zone; cooling and solidifying said glass spheres into rigid glass pebbles by passing hot gas at a temperature below the melting point of said glass countercurrent to the resulting descending stream of glass spheres; separating the resulting solidified glass into two phases by maintaining the spheres at a temperature in the range of 525 to 600° C. in the lower portion of said solidifying zone for a sufficient period to effect the separation; dissolving out one of the phases in an acid bath while leaving the other phase undissolved in a rigid porous structure; introducing a solution of catalytic material into the pores of said treated pebbles; slowly heating said pebbles containing the solution to dispel the catalyst solvent and to deposit said catalyst within the pores and on the pebbles; and recovering the catalytic pebbles.

3. A process for the production of porous siliceous pebbles having improved catalytic properties which comprises dispersing molten glass into spherical drops in a solidifying zone; passing through said zone an upwardly flowing stream of hot gas at a temperature below the melting point of said glass so as to gradually cool and solidify the resulting descending drops; separating said glass into two phases in the lower portion of said zone by heat treatment at a temperature in the range of 525 to 600° C.; dissolving out one of the phases in an acid bath while leaving the other phase undissolved in a rigid porous structure; treating said porous pebbles to etch the surface thereof; and collecting the improved pebbles.

4. A process for the production of porous siliceous pebbles having improved catalytic properties which comprises dispersing molten glass into spherical drops in a solidifying zone; passing through said zone an upwardly flowing stream of hot gas at a temperature below the melting point of said glass so as to gradually cool and solidify the resulting descending drops; separating said glass into two phases in the lower portion of said zone by heat treatment at a temperature in the range of 525 to 600° C.; dissolving out one of the phases in an acid bath while leaving the other phase undissolved in a rigid porous structure; treating said porous pebbles to etch the surface thereof; introducing an aqueous solution of catalytic material into the pores of said pebbles; slowly drying said pebbles containing the solution to deposit said catalyst within the pores and on the treated pebbles; and recovering the improved catalytically impregnated pebbles.

5. A process for the preparation of porous siliceous pebbles having improved catalytic properties which comprises dispersing molten glass containing 60–82 per cent silicon dioxide, 20–25 per cent boric oxide, and 5–10 per cent alkali oxide into drops in a stream of rising gas in a solidifying zone; cooling said dispersed drops in said gas to a temperature between about 525 and 600° C. while descending through said zone; maintaining said pebbles at the latter temperature in the lower portion of said zone for a period of time sufficient to separate said glass into two phases; dissolving out one of the phases in a bath of heated hydrochloric acid while leaving the other phase undissolved in a rigid porous structure; introducing an aqueous solution of metallic salts having catalytic properties into the pores of said pebbles; drying said pebbles after introduction of said solution to deposit said catalytic material within the pores and on the treated pebbles; and recovering said porous catalytically active pebbles.

6. A process for the production of porous siliceous pebbles having improved catalytic properties which comprises dispersing molten glass into relatively small glass spheres in a solidifying zone; cooling and solidifying said glass spheres into rigid glass pebbles in said zone by passing hot gas at a temperature below the melting point of said glass countercurrent to the resulting descending stream of glass spheres; separating said glass into two phases by heat treatment in the range of 525 to 600° C. in the lower portion of said zone; dissolving out one of the phases in an acid bath while leaving the other phase undissolved in a rigid porous structure; introducing a solution of catalytic material into the pores of said treated pebbles; slowly heating said pebbles containing the solution to dispel the catalyst solvent and to deposit said catalyst within the pores and on the pebbles; further heating the catalytic pebbles to activate the catalyst deposited thereon; and recovering said improved catalyst pebbles.

7. A process for the preparation of catalytic porous silica-alumina pebbles which comprises dispersing molten glass into drops in a hot stream of rising gas in a solidifying zone maintained at a temperature below the melting point of said glass; cooling and solidifying said dispersed glass into spherical glass pebbles while said drops descend through said zone; separating said glass into two phases by heat treatment at a temperature in the range of 525 to 600° C. in the lower portion of said zone; dissolving out one of the phases in an acid bath while leaving the other phase undissolved in a rigid porous structure; introducing an aqueous solution of aluminum nitrate into the pores of said treated pebbles; gently heating said pebbles containing the solution to dry the pebbles and deposit said aluminum nitrate on the surface of the pores and on the pebbles; further heating the pebbles with said deposited material at a higher temperature to convert said aluminum nitrate to aluminum oxide; and recovering said porous catalytic silica-alumina pebbles.

8. A process for the preparation of porous silica-alumina pebbles having improved catalytic properties which comprises dispersing molten glass containing 60–82 per cent silicon dioxide, 20–25 per cent boric oxide, 5–10 per cent alkali oxide, and 1–10 per cent aluminum oxide into drops in a hot stream of rising inert gas in a solidifying zone maintained at a temperature below the melting point of said glass; gradually cooling and solidifying said dispersed drops as they descend through said zone; separating said glass into two phases by heat treatment at a temperature in the range of 525 to 600° C. in the lower portion of said zone; partially dissolving out one of the phases so as to leave a portion of said aluminum oxide therein and leaving the other phase undissolved in a rigid porous structure; and recovering said porous silica-alumina pebbles.

9. A process for the preparation of siliceous spherical particles which comprises dispersing molten siliceous material in particulate form into the upper portion of an upright, elongated, solidifying zone; simultaneously introducing to and passing a stream of hot gas upwardly through said zone at a temperature which causes solidification of the resulting falling siliceous particles without shattering and at a rate which retards their descent to the lower portion of said zone; further cooling said pebbles in the lower portion of said zone by contacting same with a second and cooler stream of gas introduced to said zone at a point below the point of introduction of said stream of hot gas; and recovering solidified siliceous spheres from the lower portion of said zone.

10. A process for preparing siliceous pebbles which comprises dispersing molten siliceous material in particulate form into the upper portion of an upright, elongated, solidifying zone which gradually decreases in cross sectional area from the upper portion to the lower portion thereof; introducing to and passing a hot stream of gas upwardly through said zone at a temperature below the melting point of said siliceous material so as to gradually cool and solidify the resulting descending pebbles and at a rate regulated to retard the descent of said pebbles and maintain the same in turbulent condition in the portion of said zone of smaller cross section; further cooling said pebbles by introducing a second and cooler stream of gas to said zone at a point below the point of introduction of said hot stream; and recovering said cooled pebbles.

11. A process for the production of small adsorbent and catalytic siliceous spheres which comprises forming molten glass comprising 60–82 per cent silica, 20–25 per cent boric oxide, and 5–10 per cent alkali oxide; dispersing said molten glass in drop form into an upright, elongated, solidifying zone maintained at a temperature below the melting point of said glass; causing the glass drops to descend through said zone; introducing a hot stream of gas into the lower portion of said zone; passing said gas countercurrent to descending glass drops so as to solidify same and retard their descent; maintaining the resulting solid glass spheres in the lower portion of said zone at a temperature in the range of 525 to 600° C. for a time sufficient to separate the glass into a silica-rich phase and a boric oxide-alkali oxide-rich phase; further cooling and recovering said spheres; and leaching out at least a portion of said latter phase with acid so as to produce porous siliceous spheres.

12. The process of claim 11 in which a second and cooler gas stream is passed through the lower portion of said zone below the point of introduction of said hot gas so as to further cool said spheres.

13. A process for the preparation of porous, siliceous, spherical, catalytic, and adsorbent particles which comprises dispersing molten glass at a temperature between 1000 and 1200° C. into small glass particles in a solidifying zone; cooling and solidifying said glass particles by passing hot gas at a temperature below the melting point of said glass countercurrent to a gravitating stream of glass particles in said zone; separating the glass in said glass particles into an acid insoluble phase and an acid soluble phase in the lower portion of said zone by heat treatment in the range of 525 to 600° C.; cooling the glass particles to room temperature and recovering same; dissolving out the acid soluble phase in an acid bath while leaving the other phase undissolved in a rigid porous structure; and recovering the resulting porous particles.

14. A process for the preparation of porous, siliceous, spherical, catalytic, and adsorbent particles which comprises dispersing molten glass containing 60–82 per cent silicon dioxide, 20–25 per cent boric oxide, and 5–10 per cent alkali metal oxide at a temperature between 1000 and 1200° C. into small spheres in a solidifying zone; cooling and solidifying said glass spheres by passing hot gas at a temperature below the melting point of said glass countercurrent to a gravitating stream of glass spheres in said zone; separating the glass in said spheres into an acid insoluble phase and an acid soluble phase in the lower portion of said zone by heat treatment at a temperature in the range of 525 to 600° C.; cooling the glass particles to room temperature and recovering same; dissolving the acid soluble phase in an acid bath while leaving the other phase undissolved in a rigid porous structure; and recovering the resulting porous spheres.

J. FRANK CHURCH.

REFERENCES CITED

The following references are of record in the file of this patent:

UNITED STATES PATENTS

| Number | Name | Date |
|---|---|---|
| 496,044 | Deniston | Apr. 25, 1893 |
| 996,132 | Perkins et al. | June 27, 1911 |
| 1,128,175 | Morf | Feb. 9, 1915 |
| 1,837,869 | Jewett et al. | Dec. 22, 1931 |
| 2,038,251 | Vogt | Apr. 21, 1936 |
| 2,215,039 | Hood et al. | Sept. 17, 1940 |
| 2,315,329 | Hood et al. | Mar. 30, 1943 |
| 2,334,578 | Potters | Nov. 16, 1943 |
| 2,384,946 | Marisic | Sept. 18, 1945 |
| 2,387,454 | Marisic | Oct. 23, 1945 |

FOREIGN PATENTS

| Number | Country | Date |
|---|---|---|
| 112,792 | Great Britain | Jan. 7, 1918 |